(12) United States Patent
Kesmarszky et al.

(10) Patent No.: US 10,954,401 B2
(45) Date of Patent: Mar. 23, 2021

(54) SEALING LACQUER FOR APPLICATION IN A PRINTING PROCESS

(71) Applicant: CONSTANTIA PIRK GMBH & CO. KG, Pirk (DE)

(72) Inventors: Thomas Kesmarszky, Weiherhammer (DE); Markus Kick, Weiden in der Oberpfalz (DE)

(73) Assignee: CONSTANTIA HUECK FOLIEN GMBH & CO. KG, Pirk (DE)

( * ) Notice: Subject to any disclaimer, the term of this patent is extended or adjusted under 35 U.S.C. 154(b) by 0 days.

(21) Appl. No.: 16/624,269

(22) PCT Filed: Jun. 19, 2018

(86) PCT No.: PCT/EP2018/066251
§ 371 (c)(1),
(2) Date: Dec. 18, 2019

(87) PCT Pub. No.: WO2018/234306
PCT Pub. Date: Dec. 27, 2018

(65) Prior Publication Data
US 2020/0115573 A1 Apr. 16, 2020

(30) Foreign Application Priority Data
Jun. 20, 2017 (AT) ................................. A5051/2017

(51) Int. Cl.
*C09D 11/104* (2014.01)
*C09D 11/033* (2014.01)
(Continued)

(52) U.S. Cl.
CPC .......... *C09D 11/104* (2013.01); *C09D 11/033* (2013.01)

(58) Field of Classification Search
CPC .............................. C09J 125/16; C09J 153/02
See application file for complete search history.

(56) References Cited

U.S. PATENT DOCUMENTS

| 4,096,203 A | 6/1978 | St. Clair |
| 2004/0242778 A1 | 12/2004 | Etherton |

FOREIGN PATENT DOCUMENTS

| DE | 10321074 B3 * | 6/2004 | .............. C08L 53/02 |
| DE | 10321074 B3 | 6/2004 | |

(Continued)

OTHER PUBLICATIONS

Computer-generated English-language translation of EP1479514B1 (which is an equivalent of DE10321074B2). (Year: 2004).*

(Continued)

*Primary Examiner* — Vu A Nguyen
(74) *Attorney, Agent, or Firm* — Raven Patents, LLC (57) ABSTRACT

Sealing lacquer for application in a printing process, in particular for sealing packaging parts which can be peeled off from one another. The sealing lacquer has in particular a) 40 to 65 wt % solvent, b) 0 to 10 wt % styrene butadiene block copolymer, c) 8 to 12 wt % styrene alpha methylstyrene, d) 6 to 12 wt % linear and/or radial Tri-block (SBS) block, e) 0 to 10 wt % linear Di-Block (SB) block, f) 15 to 30 wt % polyester, and g) up to 3 wt % antioxidant. The sealing lacquer provides a seal that, whether the seal is opened by peeling, or the packaging is push-through packaging, provides a holding force exhibiting a strength until cohesion failure that is determined by the pressures and temperatures used during sealing.

9 Claims, 4 Drawing Sheets (51) Int. Cl.
*C09J 125/16* (2006.01)
*C09J 153/02* (2006.01)
*C09J 167/00* (2006.01)

(56) References Cited

FOREIGN PATENT DOCUMENTS

| | | |
|---|---|---|
| DE | 102014208608 A1 | 11/2015 |
| EP | 2565222 A1 | 3/2013 |
| WO | 9800471 A1 | 1/1998 |
| WO | 2015169897 A1 | 11/2015 |

OTHER PUBLICATIONS

European Patent Office, "International Search Report" in connection with related International Application No. PCT/EP2018/066251, dated Aug. 24, 2018, 4 pgs.

* cited by examiner

SEALING LACQUER FOR APPLICATION IN A PRINTING PROCESS

TECHNICAL FIELD

The invention relates to a preferably transparent, heat-sealable lacquer to be applied by a printing process according to the preamble of claim 1.

BACKGROUND

Heat-sealing lacquers are widely used in the packaging industry. Their essential task is to provide a secure and tight cohesion between two parts or portions of the packaging material when closing a package. Classic examples of application are the sealing of a plate, in normal usage variously called a lid, mostly consisting of a multilayer film, onto the edge of a cup, a bowl, or other structure of a mostly different and mechanically mostly firmer material.

Another classic field of application is the closing of bag-like packages, which are formed from a single film by bending and folding, or by matching two films to form a package and in which then inside is generally sealed against inside. Occasionally, the outside may also be sealed to the inside. All this is well known in the packaging industry and needs no further explanation.

Another classic use and application is in the production of a blister pack, in which a blister bottom film, which in the classical case is cold-formed having individual cup-shaped recesses, is sealed with a blister covering film.

Generally, but without being limited, the blister bottom film has a plurality of wells which are covered and sealed with a common covering film. A second type of blister pack is similar to the aforementioned bag-like packaging and has two films which generally have the same or a similar design, into which the product to be packaged is introduced, followed by being sealed in a longitudinal and transverse direction to present the individual goods individually packaged.

An essential point of such packaging with sealing strips or sealing edges or sealing circles, etc., is that it is desired, depending on the intended use, to design the sealing strength in various manners, with sealing strength being understood to mean the holding force of the mechanical connection. The range may be from a seal of a film easily peelable from the substrate at one end of the seal strength scale to connections in which one or both of the films and/or packaging components may not be removed without being destroyed at the other end of the scale, such as press-through films in which the seal strength must desirably be greater than the tear strength of the film.

An inherent problem is that, depending on the intended use, it is necessary during the production of the individual packaging parts to use different sealing materials and different application methods or process parameters in order to arrive at the desired result. This is laborious, both from an organization and warehousing standpoint.

There is thus a need for a sealing material which adheres to the substrate in such a firm and reliable manner that even with the desired strongest sealing force it does not detach from the substrate, and that on the other hand an easily defined sealing force, which may be influenced in broad limits, is reliably achieved by simply varying the process parameters during sealing and thus closing of the packaging.

From WO2015169897 and DE102014208608 a material is known which is produced under the name Degalan VP 4311 E by Evonik Röhm. Also known is the very similar sealing lacquer Degalan VP 4322 E, also from Evonik Röhm. A disadvantage of these sealing lacquers is the fact that an adhesion break may develop, in which the break line usually does not manifest itself within the lacquer, but between lacquer and sealed surface. A non-destructive removal can not be ensured. Another disadvantage is that with the sealing lacquers mentioned above, the sealing force can no longer be set above a temperature of 150° C. This represents a disadvantage in that in sealing processes used on the market sealing takes place only above a temperature of 150° C. Therefore, there is no possibility for influencing (setting) the sealing force in the usual range of process parameters.

In the case of laminating hot melt adhesives, it is known from U.S. Pat. No. 4,096,203 A to influence the binding force later achieved by adhering to different parameters during polymerization, but in the case of a product, once it is produced, only this binding force can be achieved. In addition, the application is much more complicated than with a lacquer.

SUMMARY

It is the object and goal of the invention to specify such a material and the corresponding procedural parameters.

These objects are achieved according to the invention in that the sealing material has the features specified in the characterizing part of claim 1.

In other words, a sealing material is used which, during peeling off, either by the correct opening or in the case of push-through packaging during testing, the sealing lacquer suffers a cohesion failure, the strength of the holding force until cohesion failure being determined by the pressures and temperatures used during sealing. The term "cohesive failure" is understood to mean that the fracture runs within the sealing material and does not result from the release of the sealant material from the substrate. The sealing material is preferably free of chlorine, aromatic compounds, acrylate, and epoxy.

DETAILED DESCRIPTION

The objects according to the invention are thus achieved with a transparent, heat-sealable coating system which can be used for sealing mainly coextruded PET films or PET-coated films, as will be evident below with reference to the example, which contains various binders and is explained in more detail with reference to the examples given below. All figures without further indication are given in percent by weight (wt.-%).

EXAMPLE 1

A combination of resins and solvents consisting of various solvents with a boiling range of +30° C. and +200° C., such as:

Solvent: 43% wt.-% of 2-butanone and cyclohexanone,
Hard and soft segments with a glass transition temperature range of −100° C. and +150° C., such as:
(SB)n-block: 5 wt.-% of styrene-butadiene random block polymer (PS-Impact Modifier with a proportion of 70% styrene and 30% butadiene rubber),
Styrene: 10 wt.-% of a polymer of styrene and alphamethylstryrene comonomers
Tri-Block: 8 wt.-% of a linear tri-block copolymer of styrene and butadiene (constituents: styrene content 31%, butadiene content 69%, of which 82% tri-block and 18% di-block), Di-Block: 8 wt.-% of a linear styrene-butadiene di-block copolymer (constituents: styrene content 33%, butadiene content 67%, of which 22% tri-block and 78% di-block), Co-polyester: 25 wt.-% of a solution of a linear, saturated, amorphous, high molecular weight co-polyester and/or a mixture thereof, and Antioxidant: 1 wt.-% of a phenolic antioxidant, altogether 100%.

This lacquer was prepared using the following procedure:

To prepare the lacquer, a mixing vessel with a suitable stirrer is used. The mixing vessel is not heated. The respective solvent is initially added and the respective proportions by weight of the following solid raw materials are slowly added to the solvent while stirring at medium speed. The mixing order is as follows:

The (SB)n block polymer is added to the solvent first, then the styrene polymer, the tri-block polymer, and finally the di-block polymer. The mixture is dissolved for about 3 hours without heating at elevated speed. Finally, the co-polyester solution and the antioxidant are added with medium speed. It is stirred for about another 10 minutes at medium speed.

For further analogous tests, the compositions shown in Table 1 were used. Table 1 also shows Example 1: Additional assays and tests were performed using formulations of Table 1 on various substrates. "Formulation 1" mentioned in Tables 1 and 2 corresponds to Example 1 mentioned in the text.

Of these substrates, mainly aluminum 0.015 mm/PET 0.012 mm, metallized or transparent polyester with thicknesses of 0.023 mm, 0.036 mm, and 0.050 mm, were used. In addition, a PET of 0.050 mm thickness was also coated in opaque white.

The best results can be achieved with the following combinations: LM 40-60 wt.-%, addition of (SB)n block 0-10 wt.-%, styrene-alpha-methyl-styrene 5-15 wt.-%, predominantly tri-block linear or radial, in each case alone or as a mixture (SBS) block: 5-20 wt.-%, predominantly di-block (SB) block 0-15 wt.-%, co-polyester 15-30 wt.-%, phenolic antioxidant 1-5 wt.-%. In a linear chain unit, the molecular units "SBS blocks" are arranged one after the other until they have received a certain MW. For radial chain units, a certain branching pattern of the SBS blocks applies amongst each other. Combinations are physical mixtures of both molecular systems with one another.

The polyester film (mono or composite) based on polyethylene terephthalate is equipped with a (co-) extruded layer between 0.5-4 g/m$^2$ based on thermoplastic, linear saturated, high molecular weight and partially crystalline co-polyester as a primer for the formulations of Table 1. Both layers are transparent with a transmittance of >99%.

These substrates were coated with an HSL (Example 1 from the text) of the formulations of Table 1 and the seal strengths were measured against PS and APET. In addition, burst pressure tests were also carried out. The results are summarized in Table 2.

Abbreviations Used in the Text and Tables

HSL Heat-seal lacquer
HF Adhesiveness
SNF Seal seam strength
APET Amorphous polyester
PET Polyester
PS Polystyrene
SB Styrene-butadiene block copolymer
SBS Styrene-butadiene-styrene copolymer The definition of the seam strength of the lacquer film on the applied substrate is to be described as a reactive compound on the substrate by heat and time.

The definition of the seal seam strength of the lacquer film to a defined ground material is to be described as the thermoplastic fusion to the base material by heat and time.

Test Methods:

The seam strength or seal test is carried out via a BRUGGER HSC, upper jaw heated on one side, Teflon-coated.

Seam strength is tested by means of 15 mm test strips and heat sealing, usually at 220° C., 1 sec and 2.35 bar, lacquer film against lacquer film or against aluminum or against the base material used. The lacquer film must completely separate in itself though tensile testing between 90° and 180° using a tensile testing machine (e.g., Zwick). There must be no detachment of the lacquer film from the substrate. The achieved value (force/15 mm) is a measure of the adhesive strength.

The seal test is carried out at 180° C. sealing temperature, 1 sec sealing time and a sealing pressure of 2.35 bar. 15 mm wide lacquered strips are cut out and sealed against the base material to be tested. A tensile test is used to determine the seal seam strength (N/15 mm).

The conditions for creating a sealing curve at different temperatures are given with a sealing time of 1 sec and a sealing pressure of 2.35 bar. 15 mm wide lacquered strips are cut out and sealed against the base material to be tested. The tensile seam strength (N/15 mm) according to DIN 55529 is determined by tensile test.

The hot seam strength test, herein expressed and determined as burst pressure, is carried out by vacuuming filled and foil sealed cups at an ambient temperature of 60° C. The values at which the closed cups yield to the internal pressure and open is the pressure specific to the sealing and a measure of the hot seam strength.

Application of the lacquer and properties:

The formulations from Table 1 are all liquid with solid contents between 20 and 40 wt.-% and a relative viscosity of 20-25 sec, given as outflow time from a standardized cup (DIN 4 cup) measured by stopwatch. The application to the respective substrate is applied by means of smooth-roller or anilox rollers with varnishing or gravure printing machines. As a rule, between 3.5 and 4.5 g/m$^2$ are applied to the polyester substrate.

The machine speeds are generally between 120 and 200 m/min at a dryer temperature between 120 and 220° C. and a drying time of 3-5 sec. The lacquer film is applied homogeneous, bubble-free and well adhering, which is checked by optical assessment under the microscope.

COMPARATIVE EXAMPLES

The decisive criterion for distinguishing the properties from the formulations available on the market based on polyester/acrylate/olefin is the adhesive strength to the substrate. The substrates here are polyester surfaces. The systems according to the prior art investigated below have adhesion strengths well below the seal seam strength and the fracture pattern is adhesive (one-sided).

Application of standard formulations:

Resin combination, consisting of the standard materials 1-6 are adjusted with MEK to a painting viscosity of about 22-35 sec/DIN 4 cup. The dry application quantity is 4 g/m$^2$±10%. In each case, the lacquer is applied to the PET side.

The materials (Degalan VP 4311 E and VP 4322 E, from Evonik Röhm, corresponding to DE 10 2014 208 608 A1 and WO2015/169897) were used as standard comparative examples, applied to the substrate A115/PET12 and metPET 36 μm on the PET side, and the adhesive strength, seal seam strength, and the hot seam strength are examined (see Table 3, standard materials 2 and 3).

Products on the market as standard materials

| | | |
|---|---|---|
| 1 | ACTEseal HSC-500 HV | Actega Rhenania |
| 2 | Degalan VP 4311 E | Evonik Röhm |
| 3 | Degalan VP 4322 E | Evonik Röhm |
| 4 | EKP 230 E | EKP |
| 5 | EKP 265 E | EKP |
| 6 | Brelack LSL 1177/45 | Adesiv |

The results clearly show the partially adhesive or adhesive removal of the lacquer from the substrate, which indicates a greater seal seam strength than adhesion and thus has the disadvantage that the adhesion to the substrate dominates the maximum seal strength. No adjustment of a desired sealing seam strength is possible.

Furthermore, during peeling or tensile testing, a partially adhesive or adhesive fracture pattern is present, which shows a partially adhesive or adhesive fracture pattern and a jerky peel behavior at a peel angle of 180° (wind-up angle) while at 90° (wind-up angle) the uniform peel behavior completely disappears and a complete separation of the sealing layer from the substrate takes place. By contrast, in the case of lacquers according to the invention, a cohesive fracture pattern is present, the opening of the cup or container (peeling behavior) takes place uniformly and without jerky opening.

BRIEF DESCRIPTION OF THE DRAWINGS

The results obtained are shown graphically in the drawing.

Figure 1:
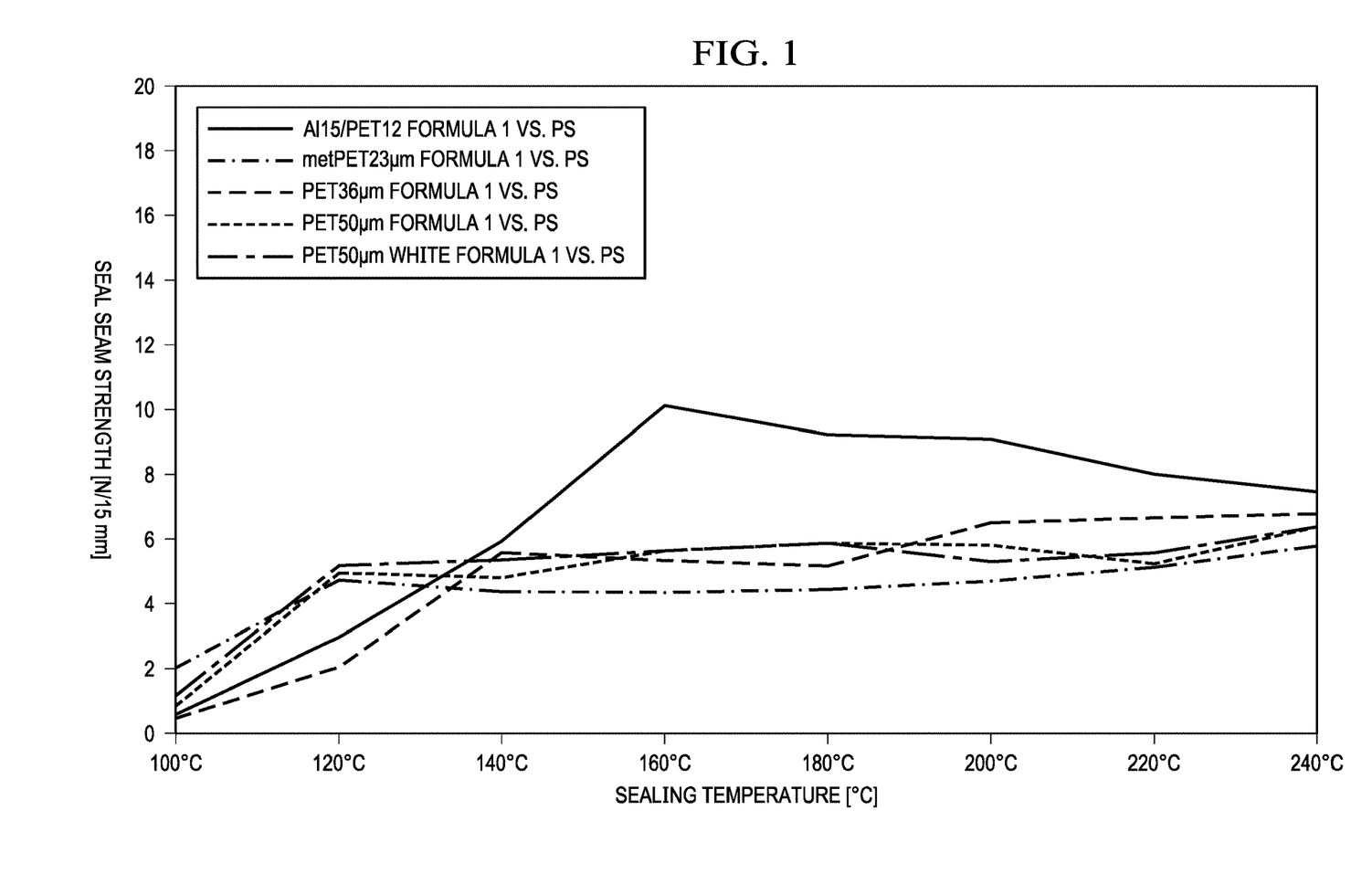
FIG. 1 shows the seal seam strengths [N/15 mm] of Formulation 1 from Table 1 or Example 1 from the text, applied to substrates 1), 3), 4), 6), and 7) from Table 2 versus PS over the sealing temperature in [° C.]
Figure 2:
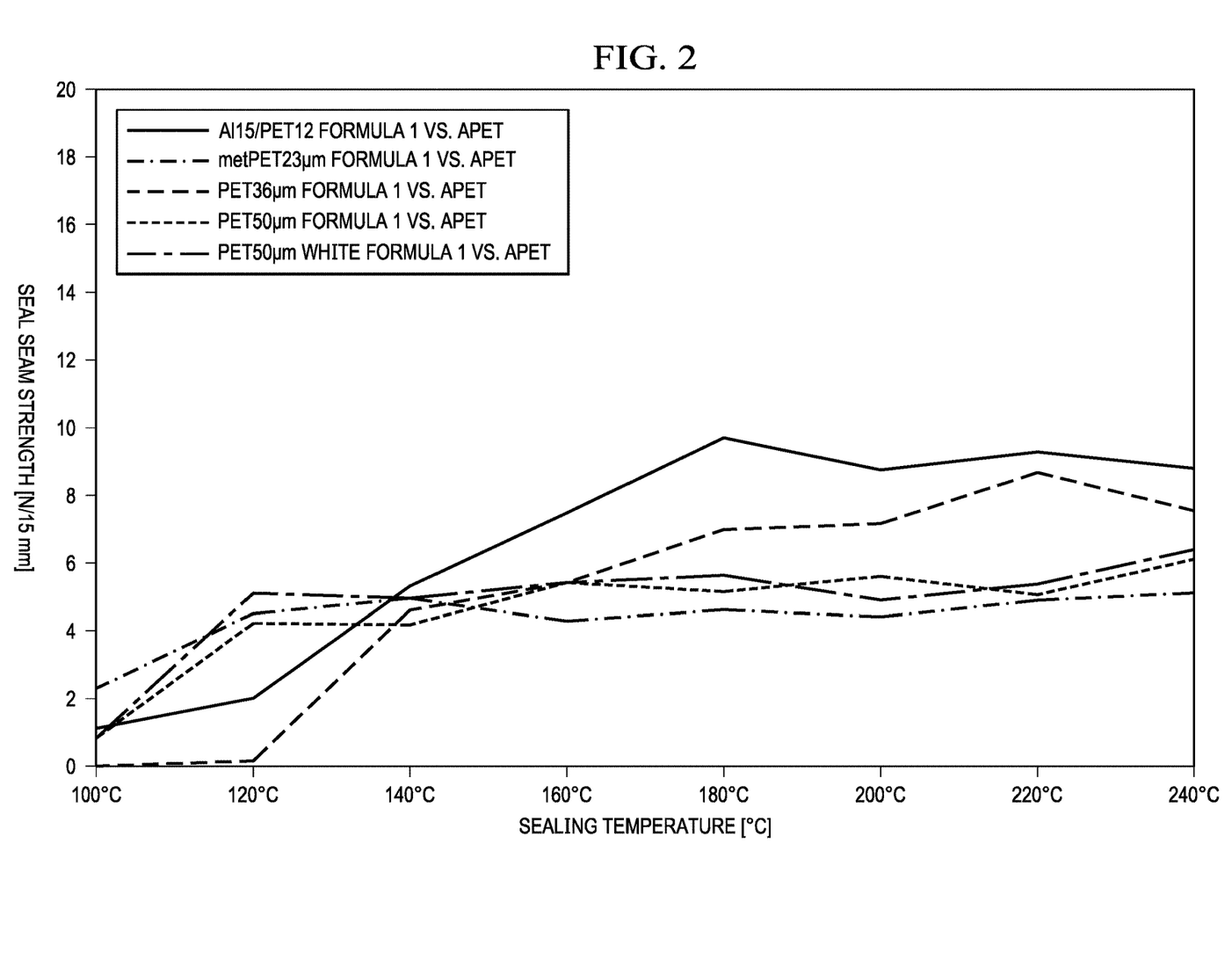
FIG. 2 shows the seal seam strengths [N/15 mm] of Formulation 1 from Table 1 or Example 1 from the text, applied to substrates 1), 3), 4), 6), and 7) from Table 2 versus APET over the sealing temperature in [° C.]
Figure 3:
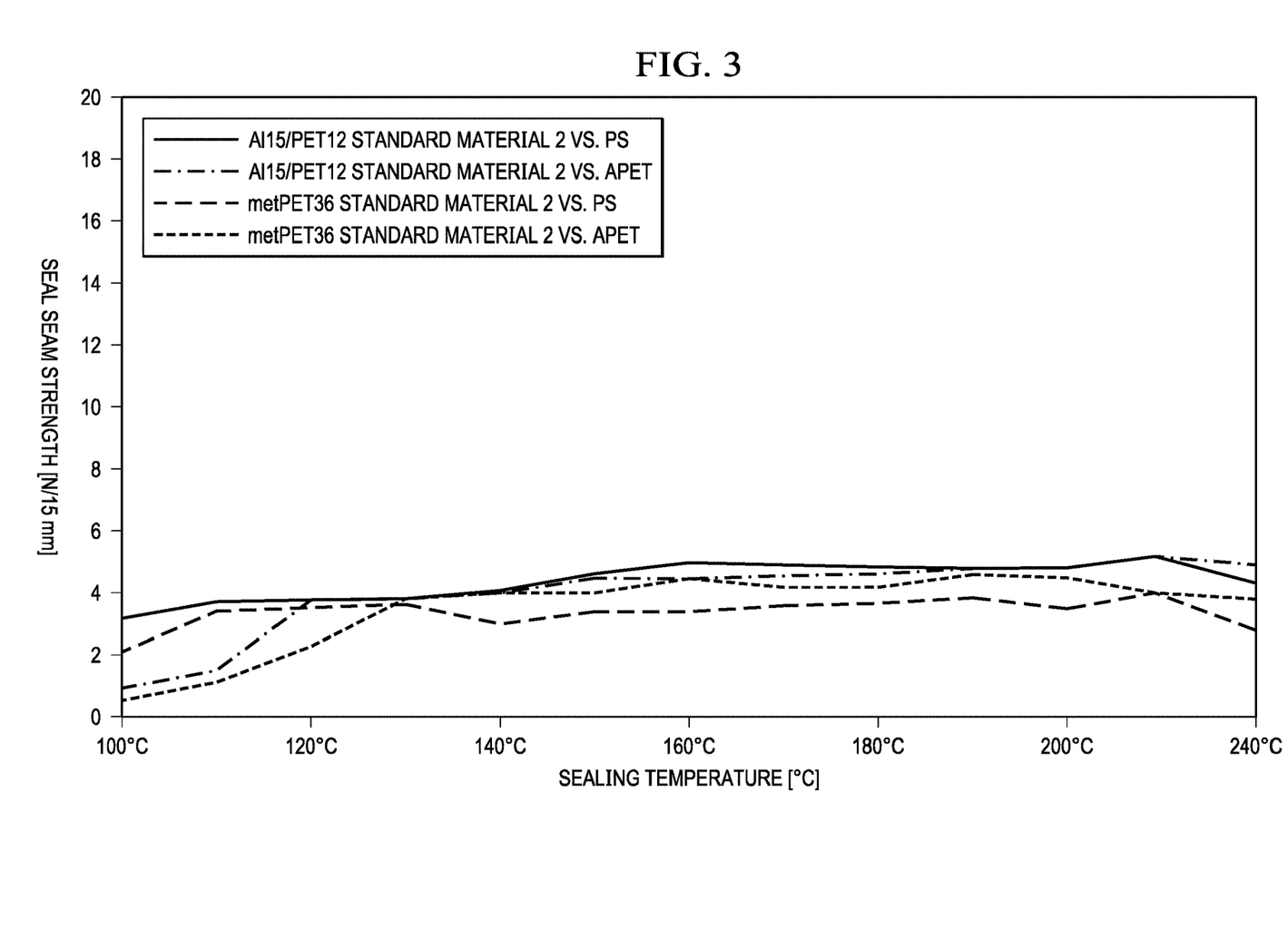
FIG. 3 shows the seal seam strengths [N/15 mm] of the comparative example (Example 2 of Table 3; Degalan VP 4311 E from Evonik Röhm) on A115/PET12 substrate and metPET 36 μm, applied on the PET side, versus PS and APET over the sealing temperature in [° C.]
Figure 4:
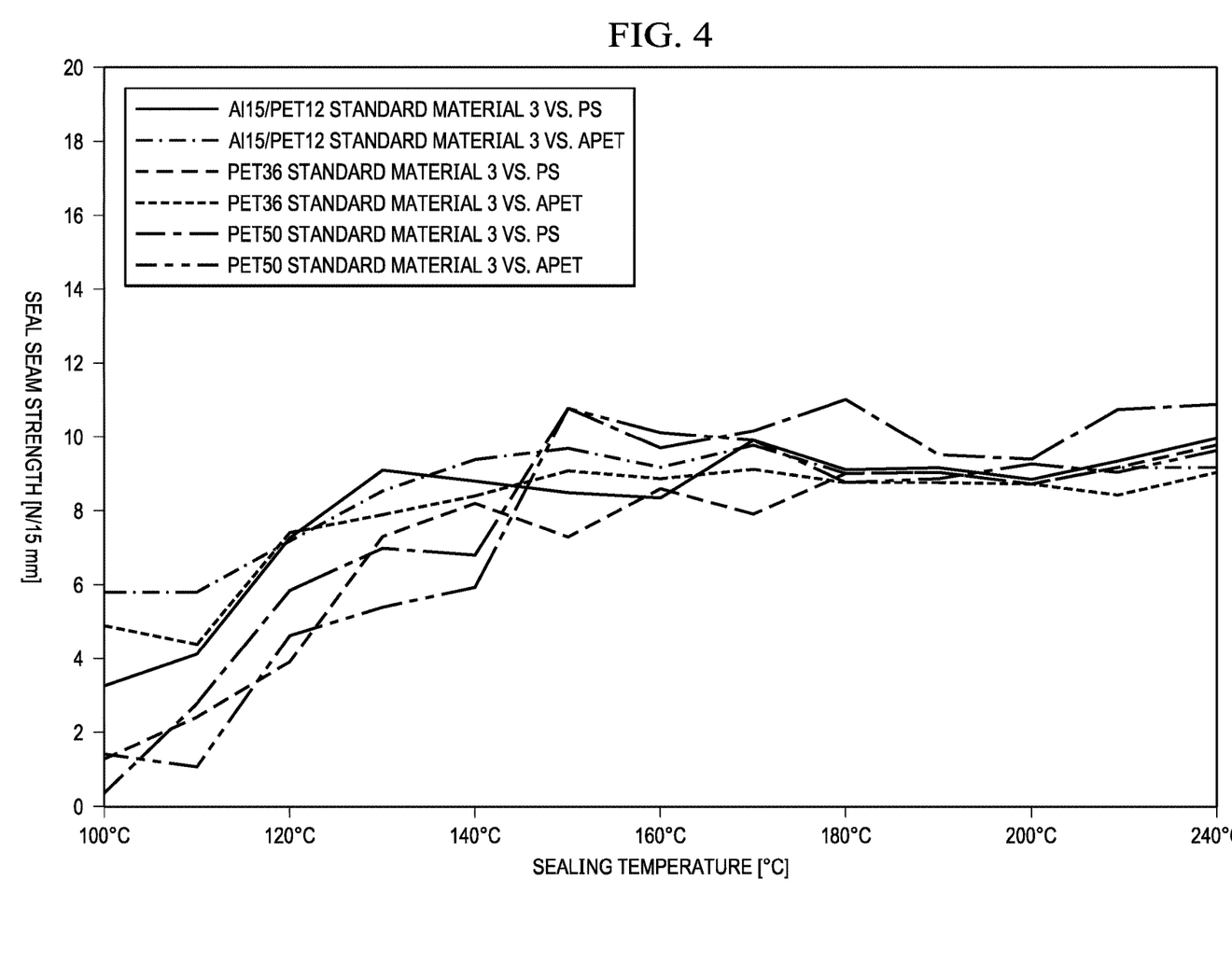
FIG. 4 shows the seal seam strengths [N/15 mm] of the comparative example (Example 3 of Table 3; Degalan VP 4322 E from Evonik Röhm) on A115/PET12 substrate and metPET 36 μm, applied on the PET side, versus PS and APET over the sealing temperature in [° C.], and The seal strengths shown in the figures show that with the heat sealing lacquers according to the invention, good or better seal seam strengths can be achieved at lower sealing temperatures compared to those of the prior art. However, the sealing lacquers in FIGS. 1 and 2 have more desirable mechanical properties than the adhesive or partially adhesive fracture of the sealing lacquers shown in FIGS. 3 and 4 due to the cohesive fracture that occurs. Furthermore, it can be seen from Tables 2 and 3 that all comparative examples have a poorer adhesive strength and a poorer hot seam strength compared to the sealing lacquers according to the invention, which, due to the increased internal pressure from heating during sealing, is desired for the sealing. The goal according to the invention of a high seal seam strength with concurrent good peeling ability of the plate from the base, in conjunction with improved process properties, is thus fulfilled.

The other lacquers according to the invention provide similar results to those of the lacquers according to the invention. The other comparative examples mentioned in the text even show inferior seal seam strengths. The best standard example was used for comparison.

The terms used are:

Solvent:

As indicated in the example, non-polar and/or dipolar/aprotic solvents may be used. Applicable examples of inventively usable nonpolar solvents are liquid hydrocarbons such as n-pentane, n-hexane, cyclohexane, methylcyclohexane, n-heptane, n-octane, iso-octane, special gasoline 80/110, with a disperse share of between 16 and 19 and a dipolar share near 0 and whose boiling range is between 60° C. and 110° C.

Applicable examples of inventively usable dipolar/aprotic solvents are liquid esters or ketones such as ethyl acetate, propyl acetate, isopropyl acetate, n-butyl acetate, acetone, methyl ethyl ketone, methyl isobutyl ketone and cyclohexanone, with a disperse share of between 15 and 17 and a dipolar share between 3 and 10 and whose boiling range is between 60° C. and 110° C.

Styrene-Butadiene Block Copolymer/Styrene-Alpha-Methyl-Styrene:

Copolymers of styrene, and α-methyl-styrene and styrene-butadiene block copolymers.

Inventively usable for the lacquer composition, are used as constituents B for sealing against polyolefinic containers, mainly unsaturated styrene-butadiene block copolymers and random styrene-butadiene copolymers. Styrene-butadiene block copolymers contain two different types of blocks or phases: The middle block is typically an olefinic or hydrogenated olefinic block, which preferably increases hot tack and adhesion. The two polystyrene end blocks form a phase which reduces the viscosity of the heat-sealing lacquer while increasing the stiffness of the heat-sealing lacquer upon cooling. The concentration and rheology of the styrene phase cause the cohesive properties of the heat-sealing lacquer, the heat resistance and the sealing temperature. The addition of high diblock styrene-butadiene block copolymers, i.e. styrene end phase and an olefinic end phase, together with the mid phase styrene-butadiene block-phase copolymers, increase internal adhesion and sealing against polyolefinic substrates.

Linear and/or Radial Tri-Block/Linear Di-Block (SB)-Block/Di-Block/Tri-Block:

"Linear" in the sense of the description and the Claims means that the co-monomers are arranged in a line. When using the term "radial" i.e. there, the comonomers are arranged branched in the chemical sense. The terms "tri-block" and "di-block" are to be understood as follows. "Tri-block" polymers consist of two endblocks (e.g., styrene) and a midblock (e.g., butadiene). Polymers of generally "di-block" character each consist of two units of an endblock (e.g., styrene) and an endblock (e.g., butadiene). Due to the polymerization process, both phases always occur next to one another in the case of the binders according to the invention.

Polyester:

The first high molecular weight, saturated, linear co-polyester CI which can be used according to the invention for the lacquer composition is a condensation product of aromatic dicarboxylic acids and non-branched short-chain aliphatic diols, but with neopentyl glycol as comonomer. However, this co-polyester is not suitable for alcoholic contents. The glass transition temperature (Tg) is 67° C. and the softening point is 155° C. The acid number is <3 mgKOH/g according to DIN EN ISO 3682 and the hydroxyl value is <9 mgKOH/g according to DIN 53 240. The average molecular weight (Mw) is about 20,000 g/mol.

The second high molecular weight, saturated, slightly branched co-polyester C2 which can be used according to the invention for the lacquer composition is a condensation product of aromatic dicarboxylic acids and slightly branched long-chain aliphatic diols, without neopentyl glycol of high flexibility and adhesion. The advantage of this co-polyester is the use for alcoholic contents, e.g. wet hygienic towels. The glass transition temperature (Tg) is 40° C. and the softening point is 130° C. The acid number is <3 mgKOH/g according to DIN EN ISO 3682 and the hydroxyl value is <9 mgKOH/g according to DIN 53 240. The average molecular weight (Mw) is about 15,000 g/mol.

Antioxidant:

Effective antioxidants for the lacquer composition according to the invention may be selected from the family of substituted phenols. Which, provided with substituents that are large, voluminous in volume and not freely movable such as a tert. Butyl group, substituted benzotriazoles and substituted phosphates. E is an additive, an effective primary antioxidant from the group of sterically hindered phenols having a molecular weight of 531 g/mol and a melting range of 50-55° C. The density is 1.02 g/cm$^3$.

"Statistics":

Styrene moieties. These may be "statistical", i.e. arranged in random order, or in "blocks", i.r. arranged in 2 or 3 blocks in order.

"Suitable Stirrer":

This selection is not critical; for the preparation of the base lacquer a mixing vessel with agitator is used, the agitator consisting of two geometric mixing elements, a shear element and a stirring element. The mixing vessel is not heated.

"Medium Speed"/"Elevated Speed":

Slow stirring about 50 rpm, medium speed about 100 rpm, elevated speed about 150 rpm.

"High Molecular Weight" and "Partially Crystalline":

High molecular weight, in a chemical sense, means an average molecular weight (Mw) of greater than 10,000 g/mol based on the respective polymer; a solid containing both crystalline and amorphous regions (domains) is referred to as partially crystalline. In the example of a co-polyester, the term "high molecular weight" means an average molecular weight of >15,000 g/mol and "partially crystalline" a degree of crystallization of 20-40%. Both terms are always to be regarded depending on the particular polymer and can change accordingly.

TABLE 1

Various formulations of HSL in wt. % including sealing seam strengths against PS and APET (substrate AL15/PET12)

| Example | Solvent | (SB)n-Block | Styrene-alpha-methyl-styrene | Tri-Block Linear/Radial (SBS)-Block | Di-Block (SB)-Block | Co-Polyester | Antioxidant | Application Amount (g/m$^2$) | Seal Strength PS 160/180/200° C. | Seal Strength APET 160/180/200° C. |
|---|---|---|---|---|---|---|---|---|---|---|
| Formulation 1 | 43 | 5 | 10 | 8 (linear) | 8 | 25 | 1 | 4 | 10/9/9 | 7.5/10/9 |
| Formulation 2 | 60 | 0 | 10 | 10 (linear) | 0 | 19 | 1 | 4 | 4/4.5/5 | 11/11/10 |
| Formulation 3 | 60 | 0 | 10 | 10 (radial) | 0 | 19 | 1 | 4 | 7/7.7/7.7 | 8/9/7 |
| Formulation 4 | 45 | 0 | 10 | 8 (linear) 8 (radial) | 0 | 28 | 1 | 4 | 6/6/6.5 | 7.5/8/8 |
| Formulation 5 | 43 | 5 | 10 | 8 (linear) 8 (radial) | 0 | 25 | 1 | 4 | 7/7/7.5 | 8/8.5/8 |

TABLE 2

Various substrates coated with HSL 1 from Table 1 and test results. In each case, the lacquer was applied to the polyester side.

| Films | Formulation | HF to substrate [N/15 mm] | SNF vs. PS [0 N/15 mm] | SNF vs. APET [0 N/15 mm] | Fracture Pattern | Warm seam strength, meas. as burst pressure vs. PS cup [0 mbar] | Warm seam strength, meas. as burst pressure vs. APET cup [0 mbar] |
|---|---|---|---|---|---|---|---|
| 1) A115/PET12 | 1 | >10 | 8.0 | 7.6 | cohesive | −700 | −610 |
| 2) Transp. PET 23 μm | 1 | >7 | 6.4 | 6.1 | cohesive | −590 | −600 |
| 3) Met. PET 23 μm | 1 | >7 | 6.6 | 6.2 | cohesive | −590 | −670- |
| 4) Transp. PET 36 μm | 1 | >9 | 7.4 | 6.7 | cohesive | −590 | −590 |
| 5) Met. PET 36 μm | 1 | >9 | 7.1 | 7.0 | cohesive | −560 | −560 |
| 6) Wite PET 50 μm | 1 | >5 | 4.1 | 3.9 | cohesive | −490 | −500 |
| 7) Transp. PET 50 μm | 1 | >5 | 4.0 | 3.8 | cohesive | −480 | −490 |

TABLE 3

Test results with standard HSL materials. In each case, the heat-seal lacquers were applied to the polyester side.

| Films | Standard Materials | HF to substrate | SNF vs. PS [0 N/15 mm] | SNF vs. APET [0 N/15 mm] | Fracture Pattern | Warm seam strength, meas. as burst pressure vs. PS cup [0 mbar] | Warm seam strength, meas. as burst pressure vs. APET cup [0 mbar] |
|---|---|---|---|---|---|---|---|
| A115/PET12 | 1 | >7 | 7.0 | 6.9 | adhesive | −560 | −540 |
| Met. PET 36 μm | 1 | >7 | 6.8 | 7.1 | adhesive | −530 | −570 |
| A115/PET12 | 2 | >4 | 4.0 | 4.0 | partially adhesive | −500 | −400- |
| Met. PET 36 μm | 2 | >4 | 4.0 | 4.0 | adhesive | −360 | −340 |
| A115/PET12 | 3 | >4 | 8.7 | 8.9 | adhesive | −520 | −430 |
| Met. PET 36 μm | 3 | >4 | 8.8 | 9.7 | adhesive | −340 | −240 |
| Transp. PET 50 μm | 3 | >4 | 9.4 | 9.3 | adhesive | −350 | −330 |
| A115/PET12 | 4 | >6 | 6.2 | 6.0 | adhesive | −460 | −480 |
| A115/PET12 | 5 | >6 | 8.1 | 8.0 | partially adhesive | −500 | −480 |
| A115/PET12 | 6 | >6 | 8.4 | 8.0 | adhesive | −450 | −450 |

What is claimed is:

1. A sealing lacquer for application in a printing process for sealing packaging parts which can be peeled off from one another, the sealing lacquer containing:
    a) 40 to 65 wt.-% of a solvent,
    b) 0 to 10 wt.-% of a styrene-butadiene block copolymer,
    c) 8 to 12 wt.-% of a styrene-alpha-methyl-styrene,
    d) 6 to 12 wt.-% of a linear and/or radial tri-block (SBS)-block,
    e) 0 to 10 wt.-% of a linear di-block (SBS)-block,
    f) 15 to 30 wt.-% of a polyester, and
    g) up to 3 wt.-% of a antioxidant.

2. The sealing lacquer according to claim 1, wherein 2-butanone and/or cyclohexanone is used as the solvent.

3. The sealing lacquer according to claim 1, wherein the sealing lacquer contains a statistical styrene-butadiene random block polymer ((SB)n-block).

4. The sealing lacquer according to claim 1, wherein the styrene-alpha-methyl-styrene copolymer of the sealing lacquer includes a random styrene-alpha-methyl-styrene copolymer.

5. The sealing lacquer according to claim 1, wherein the tri-block (SBS)-block is linear or radial.

6. The sealing lacquer according to claim 5, wherein the tri-block is supplied in each case alone or as a mixture, and that the tri-block includes parts of di-block and tri-block, wherein a tri-block proportion is greater than a di-block proportion.

7. The sealing lacquer according to claim 1, wherein the di-block is linear and includes parts of di-block and tri-block, wherein a di-block proportion is greater than a tri-block proportion.

8. The sealing lacquer according to claim 1, wherein the polyester has a glass transition temperature between −50° C. and +80° C.

9. The sealing lacquer according to claim 1, wherein the lacquer contains up to 3% by weight of phenolic antioxidant.

* * * * *